G. B. COWLES.
Plumb-Bobs.
No. 138,790.          Patented May 13, 1873.
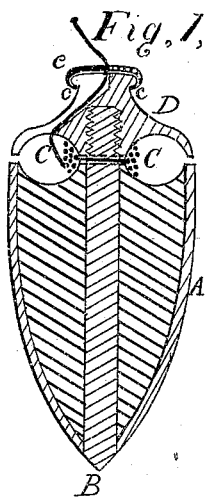
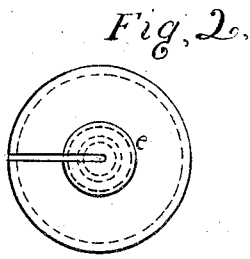
Witnesses: A. Skaats, G. Skaats
Inventor: George B Cowles

UNITED STATES PATENT OFFICE

GEORGE B. COWLES, OF BRIDGEPORT, CONNECTICUT.

IMPROVEMENT IN PLUMB-BOBS.

Specification forming part of Letters Patent No. 138,790, dated May 13, 1873; application filed March 10, 1873.

*To all whom it may concern:*

Be it known that I, GEORGE B. COWLES, of Bridgeport, county of Fairfield, State of Connecticut, have invented an Improved Plumb-Bob, of which the following is a specification:

My invention consists in the arrangement of a recess in the upper portion of plummet, covered with a cap slotted from the periphery to the center, and in providing a locking-tip, also slotted to the center; the object being to provide a receptacle for the hanging cord that shall lift from the center of plummet, while I am enabled to vary the length of cord to suit location.

In the drawing, Figure 1 is a longitudinal section. Fig. 2 is an end view.

The shell A is of brass or iron fitted to the spindle B, of either steel or iron, and is pointed at its lower end. This shell is filled with lead or equivalent, leaving the lower portion of recess C, as shown. To form the recess C I fit the cap D to the spindle B, so that it bears on a shoulder at the spindle, and leaving a space between it and the shell A wide enough for the free admission of the cord. In this cap a slot is cut from its periphery to the center on one side to enable me to bring the cord up to the center of plummet so that the lift will be on a line with the index-point. To confine the cord to this point, I arrange the locking-tip *e* either by a screw or by turning the edges under the bead, as shown at *c*. In the center of this tip I drill a hole nearly the size of the cord to be used, and cut a slot from the outside to it. The end of cord is secured to the spindle B by a hole drilled through it and riveted to prevent its turning on the spindle. The cord is then wound around the spindle in the recess when not in use, or such length as is not needed is left wound on the spindle. It is then passed up through the slot to the center of tip *e*, and held in a central position by turning the tip partially around, which covers the slot in cap D.

What I claim as new, and desire to secure by Letters Patent, is—

In a plumb-bob, the recess C, spindle B, slotted cap D, and locking-tip or equivalent *e*, substanally as described and set forth.

In testimony whereof I have signed my name to this specification before two subscribing witnesses.

GEORGE B. COWLES.

Witnesses:
 A. SKAATS,
 G. SKAATS.